(No Model.)

D. H. McCOY.
RATCHET DRIVING MECHANISM.

No. 322,622. Patented July 21, 1885.

WITNESSES:
Otto Berger
C. Sedgwick

INVENTOR:
D. H. McCoy

BY
ATTORNEYS.

N. PETERS, Photo-Lithographer, Washington, D. C.

UNITED STATES PATENT OFFICE.

DANIEL HENRY McCOY, OF SMITHVILLE, NEW JERSEY.

RATCHET-DRIVING MECHANISM.

SPECIFICATION forming part of Letters Patent No. 322,622, dated July 21, 1885.

Application filed November 18, 1884. (No model.)

*To all whom it may concern:*

Be it known that I, DANIEL HENRY McCOY, of Smithville, in the county of Burlington and State of New Jersey, have invented a new and Improved Ratchet Driving Mechanism, of which the following is a full, clear, and exact description.

The object of my invention is to improve the construction of ratchet driving mechanism, so that the pawls of the driving-clutch shall act more positively to drive or operate the connected machine, and noisy rattling of the pawls on the return of the driving clutch-section for a new hold is prevented, and whereby the pawls are held out of engagement with the driven clutch-section when the operating treadle or lever is not worked, so that the machine driven—a bicycle, for instance—may run freely in either direction without effect on the ratchet driving mechanism.

The invention consists in particular constructions and combinations of parts of the ratchet driving mechanism, all as hereinafter fully described and claimed.

Reference is to be had to the accompanying drawings, forming part of this specification, in which similar letters of reference indicate corresponding parts in all the figures.

Figure 1:
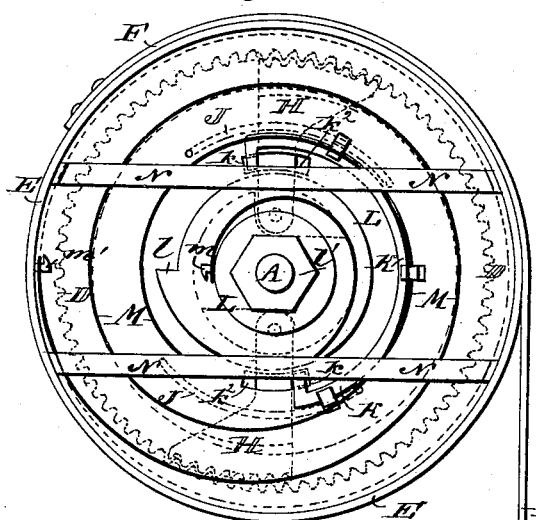
Figure 2:
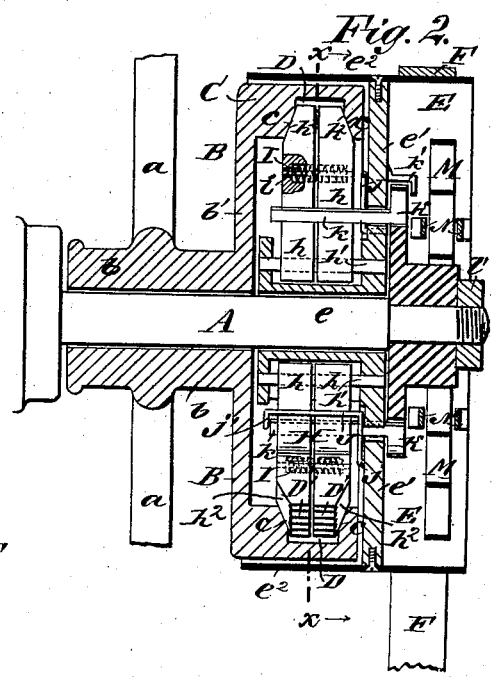
Figure 4:
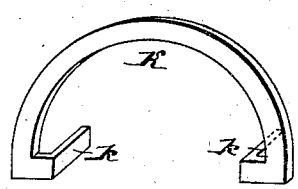
Figure 3:
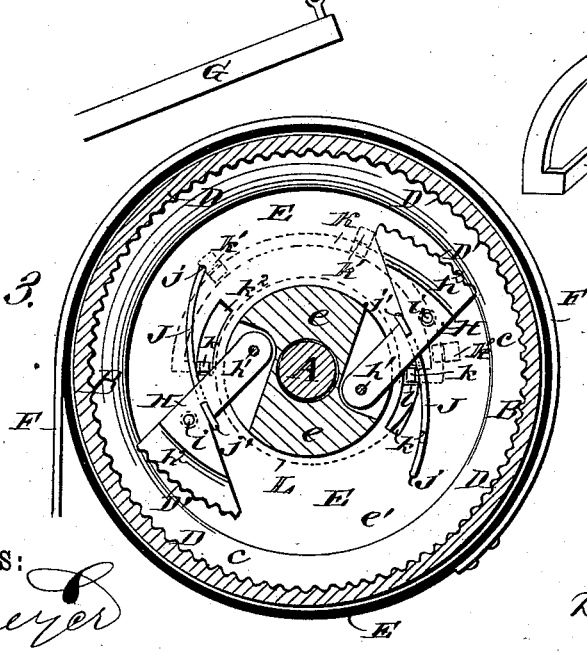

Figure 1 is an end view of my improved ratchet driving mechanism. Fig. 2 is a transverse sectional elevation thereof. Fig. 3 is a reverse end view in section on line $x \, x$, Fig. 2; and Fig. 4 is a perspective view of the pawl-tripper.

The letter A indicates a fixed stud or shaft, which may represent the axle of a bicycle, tricycle, or other vehicle, or may project from any part of a machine-frame to serve as a support to the part to be driven, and the mechanism for driving it, as hereinafter explained. By way of illustration I will describe the ratchet mechanism as applied to use in driving a vehicle, the spokes $a$ of the vehicle-wheel being rigidly connected to the driven part or section B of the driving mechanism, which constitutes the hub of the wheel, and is fitted loosely on the shaft A by its central hub portion, $b$, from which the plate $b'$ extends to connect the horizontally-projecting flange or rim C of the part B to the hub.

In the inner face of the flange C is formed an annular recess, which has opposite inclined or tapering side walls, $c \, c$, and is provided with corrugated, roughened, or toothed surface, said teeth D forming the base of the recess toward which the side walls, $c \, c$, of the groove converge.

On the shaft A is fitted loosely, by its inwardly-extended hub portion $e$, the driving part or section E of the motor, and a plate, $e'$, connects the hub $e$ with the rim $e^2$, to which the operating strap, cord, or chain F is connected and to which the treadle G is attached.

H are the driving or clutch pawls of the motor, which consist each of two parts, $h \, h$, pivoted on strong pins $h'$ to the hub $e$ of the driver E, and having chamfered or beveled outer faces, $h^2$, adapted to engage the inclined side walls, $c \, c$, of the recess of flange C, and having also roughened, corrugated, or toothed outer ends, the teeth D' of which are adapted to engage the teeth D of the flange C. Near their outer ends the parts $h \, h$ of each pawl H have a pin, $i$, passed through them transversely to serve with the pivot-pins $h'$ as guides to the two parts of the pawls to hold their toothed outer ends steadily as the parts $h \, h$ are crowded together or toward each other by contact of their faces $h^2 \, h^2$ with the walls $c \, c$ of the flange C, to allow their end teeth, D', to fairly engage the teeth D of the flange, and a spring, I, fitted in opposite recesses of the inner faces of the parts $h \, h$, and held preferably on the guide-pin $i$, acts to force the parts $h \, h$ of the pawl from each other.

The letter J indicates a wire spring, which is fastened at $j$ to the plate $e'$ of driver E, and hooks around the pawl at $j'$, and tends to throw the pawl into gear with the teeth D on part B of the motor; but these springs may be dispensed with, if desired, as the pawls will engage the teeth D by gravity; but the springs secure a more prompt action, and hence are preferred in practice.

To the plate $e'$ of the driver E is held loosely, by brackets $k'$ or otherwise, the pawl-tripper K, which has arms $k$ extending through slots $k^2$ in the plate $e'$, and standing in front of the pawls H, the tripper being curved and having an arm, $k$, on each end, as shown, to act on two pawls; but the tripper will have a single arm or more than two when a single pawl or more than two pawls are used, one arm, $k$, being provided for each pawl.

To the end of shaft A is rigidly fixed in any approved way, as by placing it against a shoulder on the shaft and by screwing a nut, $l'$, outside of it on the shaft, the collar or plate L, which has a toe, $l$, adapted to strike the end or one arm, $k$, of the tripper K to swing back the pawls H, and to the collar L is fixed one end, $m$, of a coiled spring, M, the other end, $m'$, of which is fixed to the rim $e^2$ of the driver E, so that the spring acts to turn the driver backward after each downpull of the strap F, which turns it forward.

Any suitable guides, as at N, may be provided to guide and laterally support the spring, and a cap of any kind may be fitted to the end of the driver E to cover and protect the mechanism of the motor.

The operation is as follows: As the treadle is forced downward the driving-section E of the motor will be turned, which will carry the pawls H into engagement with the teeth D on the part B, to drive it and the vehicle-wheel connected therewith forward, the parts $h\ h$ of the pawls being gradually forced toward each other by contact of their faces $h^2$ with the walls $c\ c$ of flange C until the teeth D' of the pawls engage the teeth D of the flange, by a positive clutching action, to carry the part B forward, the spring M being at the same time wound up or put in tension, and when the pressure on the treadle is relaxed the spring M acts instantly to turn back or reverse the motion of the driving-section E, while the momentum of the driven section B carries it forward, and the friction then occuring between the faces $h^2\ h^2$ of the pawls and the faces $c\ c$ of the part B swings the pawls inward and disengages their teeth D' from the teeth D of the section E, and as the pawls H swing inward their springs I force their parts $h\ h$ from each other, and hold their faces $h^2\ h^2$ against the faces $c\ c$ with a light pressure, sufficient to prevent all rattling of the pawls against adjacent parts of the motor and obviating entirely the disagreeable noise incident to most pawl-and-ratchet driving mechanism; and as the spring M carries the driver E to its extreme backward position, the tripper K will strike the relatively fixed toe $l$ of the collar L, which will swing the tripper back, so as to carry its arms $k$ along the slots $k^2$ and against the backs of pawls H, to hold the pawls out of engagement with the teeth D, as in Fig. 3, which is the normal relation of the pawls when the motor is not drawn upon by the belt F; hence, when the treadle is not operated the wheel connected to part B of the motor may be turned freely in either direction, allowing the vehicle to be run backward or forward by hand without operating the ratchet mechanism or the treadle, which is an important feature of my invention. When the treadle again is depressed, the tripper will be carried away from the toe $l$ of the collar L, and the pawls H, aided, it may be, by the springs J, will again engage the teeth D of the part B to give the next forward impulse to the vehicle, in the manner above described. The collar L may be set on the shaft A, with its toe $l$ in any desired position, to throw the tripper K earlier or later, according to the length of stroke it is desired to give the operating-treadle.

It is evident that the part B of my ratchet driving mechanism may connect with a belt-pulley rim to give motion to sewing-machines or drive hand or horse power mowing-machines, or the feed-wheels of up-and-down saw-mills and many other kinds of machinery.

The pull-belt F may be worked by a suitably-arranged hand-lever, as will readily be understood.

Having thus described my invention, what I claim as new, and desire to secure by Letters Patent, is—

1. The combination, in a ratchet driving mechanism and with the clutch-sections B E fitted loosely on a relatively fixed shaft, A, of the flange C on section B, having an interior groove provided with inclined faces $c\ c$, converging toward the bottom teeth, D, and the pawls H, pivoted to section E, and consisting of two parts, $h\ h$, forced apart by a spring, and having inclined faces $h^2\ h^2$, adapted to the faces $c\ c$ of flange C, and end teeth, D', adapted to the teeth D of section B, substantially as herein set forth.

2. The combination, in a ratchet driving mechanism and with the clutch-sections B E fitted loosely on a relatively fixed shaft, A, of the flange C on section B, having an interior groove provided with inclined faces $c\ c$, and the pawls H, pivoted to section E, and consisting of two parts, $h\ h$, forced apart by a spring, and having inclined faces $h^2\ h^2$, adapted to the faces $c\ c$ of flange C, substantially as herein set forth.

3. The combination, with two clutch-sections of a ratchet driving mechanism fitted loosely on the same shaft, and the pawls of one section engaging the other section, of a tripper having arms standing in front of the pawls and means for throwing the tripper to hold the pawls out of engagement with the driven clutch-section, substantially as herein set forth.

4. The combination, in a ratchet driving mechanism, of the clutch-sections B E, loose on shaft A, pawls pivoted to section E and engaging section B, the retracting-spring M, a collar, L, held rigidly to shaft A and having a toe, $l$, and the loose tripper K, having arms $k$, projecting in front of the pawls H, substantially as herein set forth.

5. The combination, in a ratchet driving mechanism, of the clutch-sections B E, fitted loosely on shaft A, the pawls H, pivoted at $h'$ to the hub $e$ of the section E, and formed of two parts, $h\ h$, forced apart by a spring, and having beveled faces $h^2 h^2$, engaging the inclined faces $c c$ of the section B, and teeth D', engaging teeth D of part B, the collar L, having a toe, $l$, the tripper K, having arms $k$ standing in front of the pawls, means for turning the clutch-section E forward, and a retracting-spring, M, all constructed and arranged to operate substantially as herein set forth.

DANIEL HENRY McCOY.

Witnesses:
SAMUEL ELLERSON,
FRANK E. CRAWFORD.